United States Patent [19]

Champan

[11] 3,976,849
[45] Aug. 24, 1976

[54] TELEPHONE WIRING TESTER
[75] Inventor: Louis W. Champan, Bellevue, Wash.
[73] Assignee: Melco, Bellevue, Wash.
[22] Filed: Aug. 1, 1975
[21] Appl. No.: 601,048

[52] U.S. Cl. .................... 179/175.25; 179/175.3 R
[51] Int. Cl.² .......................................... H04M 1/24
[58] Field of Search .............. 179/175.1 R, 175.11, 179/175.25, 175.3 R, 175.3 A

[56] References Cited
UNITED STATES PATENTS

| | | | |
|---|---|---|---|
| 2,367,013 | 1/1945 | Edmonds | 179/175.3 R |
| 3,711,661 | 1/1973 | Garrett | 179/175.1 R |
| 3,870,836 | 3/1975 | Kusama | 179/175.3 R |
| 3,922,507 | 11/1975 | White | 179/175.3 R |

Primary Examiner—David L. Stewart
Attorney, Agent, or Firm—Sherman Levy

[57] ABSTRACT

A test unit for testing the wiring connections in modular telephone installations. The unit consists of a housing with an input jack to receive the standard plug used to connect the telephone wiring to a handset. The jack has four terminals, one pair corresponding to the green and red(tip-ring) line wires, and the other pair corresponding to the yellow and black (ground and lamp a.c.) line wires. The tip-ring terminals are connected in the housing through a first diode, a Zener diode and a resistor to a "tip-ring" L.E.D. The a.c. terminals are connected in the housing to a "lamp" L.E.D. through a diode and a transistor, controlled by a network including a blocking capacitor. When the telephone line plug is inserted in the test unit jack, the "tip-ring" L.E.D. will light only if the "tip-ring" line voltage is correct in magnitude and polarity, and the tip ring line conductors have not been interchanged with the a.c. line conductors. The "lamp" L.E.D. will light to indicate proper a.c. voltage on the a.c. line conductors. If the a.c. voltage is too low the "lamp" L.E.D. will be dim. The "lamp" L.E.D. will not light if the a.c. line conductors carry d.c. voltage.

8 Claims, 2 Drawing Figures

TELEPHONE WIRING TESTER

This invention relates to telephone line testing devices, and more particularly to a portable testing unit which can be employed in testing the wiring connections for a telephone handset of the type employing a multiple-conductor plug received in a mating jack in the handset for connecting the handset to the telephone lines.

A main object of the invention is to provide a novel and improved telephone line test unit which is very compact in size, which is easy to use, and which provides reliable visual indications as to the proper connections and line voltages of a telephone installation.

A further object of the invention is to provide an improved test device to check for the presence of a minimum voltage of the correct polarity between the tip and ring line conductors of a telephone installation and also to check for the presence of a proper a.c. lamp voltage between ground and the lamp lead on a modular jack type telephone installations, the test device being usable without requiring the use of tools, providing immediate and visible indications, and giving indications showing the presence of a minimum d.c. voltage of correct polarity between the tip and ring line conductors and establishing the presence of proper a.c. voltage between the ground and lamp line conductors of the installation.

A still further object of the invention is to provide a compact and inexpensive telephone line testing device usable by telephone installers and similar personnel for testing the integrity of wiring connections for telephone installations, the device involving relatively few components, being light in weight, being durable in construction, being small enough to carry in a user's pocket, and requiring no batteries.

Further objects and advantages of the invention will become apparent from the following description and claims, and from the accompanying drawings, wherein:

Figure 1:
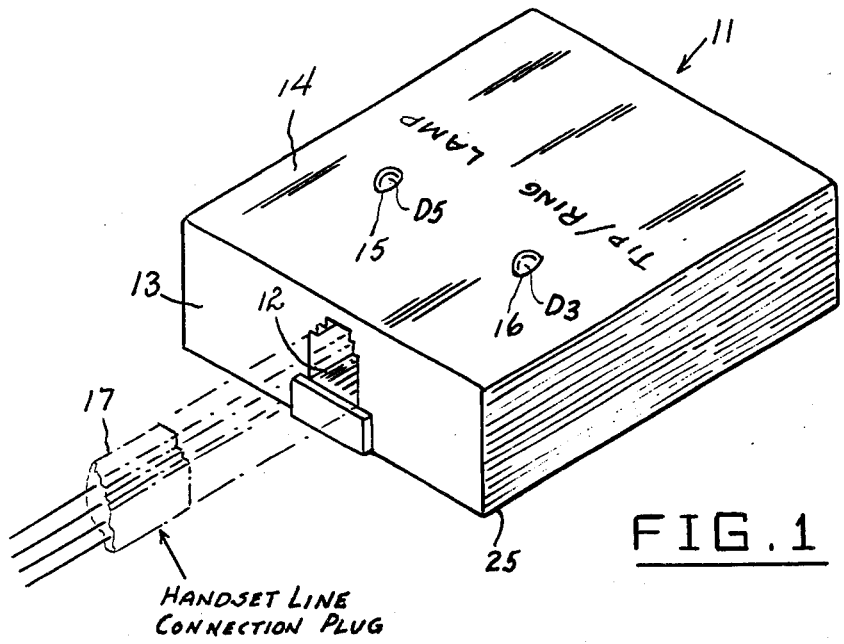
FIG. 1 is a perspective view of a telephone line testing device constructed in accordance with the present invention, and showing how a conventional telephone handset line plug can be connected to the device for testing the associated telephone lines.
Figure 2:
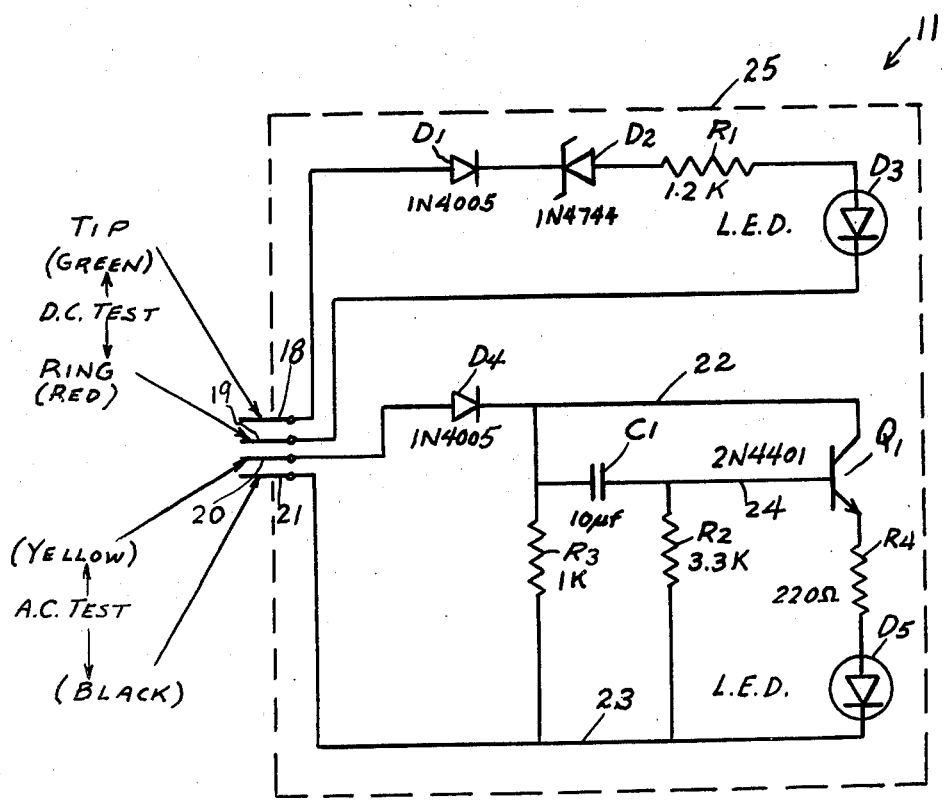
FIG. 2 is a wiring diagram showing the electrical connections of the testing device of FIG. 1.

Referring to the drawings, 11 generally designates an improved test unit constructed in accordance with the present invention. The test unit 11 comprises a generally rectangular housing 25 provided with a four-terminal input jack 12 centrally mounted in one end wall 13 of the housing. The top wall 14 of the housing is formed with apertures 15 and 16 through which respectively project the top ends of conventional L.E.D. (light-emitting-diodes) $D_5$ and $D_3$ mounted on an insulating board, not shown, suitably secured in the housing. The input jack 12 is adapted to receive the standard four-terminal plug 17 used to connect the associated telephone wiring to a telephone handset in modular telephone installations of the type wherein the handset is provided with a dial lamp as well as with the normal receiver-transmitter equipment. Thus, the test unit 11 can be readily substituted for a handset by removing the line plug 17 from the handset and inserting the plug 17 into the test unit jack 12.

The jack 12 is provided with the contact elements 18, 19, 20 and 21 corresponding respectively to the tip (green wire), ring (red wire), and dial lamp a.c. (yellow and black wires) input conductors of the 4-wire line cable cord connected to a terminal plug 17.

The contact elements 18 and 19 are connected to a series circuit comprising a diode $D_1$, which may be of the 1N4005 type, a zener diode $D_2$, which may be of the 1N4744 type, a resistor $R_1$, which may have a resistance of about 1200 ohms, and light-emitting diode $D_3$.

The contact element 20 is connected through a diode $D_4$, which may be of the 1N4005 type, and a wire 22 to the collector of a transistor $Q_1$, which may be of the 2N4401 type. A d.c.-blocking capacitor $C_1$, which may have a capacitance of about 10 mfd., is connected between wire 22 and a wire 24 connected to the base of transistor $Q_1$. The emitter of transistor $Q_1$ is connected through a resistor $R_4$, which may have a value of about 220 ohms, and the light-emitting diode $D_5$ to a return wire 23, which is connected to the contact element 21. A resistor $R_3$, of about 1000 ohms resistance is connected between wire 22 and wire 23, and a resistor $R_2$ of about 3300 ohms resistance is connected between the transistor base wire 24 and the return wire 23.

The test device 11 is substituted for the telephone handset when it is intended to check for the presence of a minimum d.c. voltage of the correct polarity between the incoming tip and ring line wires and also at the same time to check for the presence of correct a.c. voltage between the incoming station ground (yellow wire) and "lamp" (black wire) line wires. The L.E.D. indicators $D_3$ and $D_5$ are provided to give a visual indication of these two conditions. If the d.c. voltage at contacts 18, 19 is not sufficient or is of the wrong polarity, the tip/ring indicator $D_3$ will not light. The tip contact element 18 has to be positive and the d.c. voltage has to exceed 18 v. (the conduction voltage of zener diode $D_2$ is about 15 v.) for the L.E.D. indicator $D_3$ to light.

If a condition exists where the tip and ring conductors have been interchanged in the line wiring with the 10 v.a.c. line conductors, the tip/ring indicator $D_3$ will not light, since zener diode $D_2$ will not conduct.

To detect the presence of 10 v.a.c. between the "lamp" lead (black wire) and the station ground lead (yellow wire), the a.c. amplifier circuit connected to contact elements 21, 20 is utilized. The L.E.D. indicator $D_5$, labelled "lamp" will illuminate if there is 10 to 18 v.a.c. present. If there is less than 10 v.a.c. present, the indicator $D_5$ will be dim. The amplifier circuit will not respond to d.c. voltage.

Therefore, if a condition exists where the tip and ring line conductors have been interchanged with the 10 v.a.c. line conductors, the "lamp" indicator $D_5$ will not illuminate.

In operating the test device, as above described, the diode $D_1$ establishes the polarity necessary on the "tip" contact 18, namely, positive. Zener diode $D_2$ establishes the minimum voltage for the L.E.D. indicator $D_3$ to illuminate. Resistor $R_1$ prevents excessive current from flowing in this circuit when it is connected across a short loop. Zener diode $D_2$, having a zener voltage of 15 volts, prevents a.c. voltages in the range of 10 to below 18 volts from turning on the tip/ring L.E.D. indicator $D_3$.

In simultaneously checking for the presence of a proper a.c. voltage, $D_4$ establishes the correct polarity for transistor $Q_1$ to operate. When contact element 20 goes positive with respect to contact element 21, $D_4$ conducts, placing a positive potential on the collector of transistor $Q_1$; also a positive pulse is coupled through capacitor $C_1$ to the base of transistor $Q_1$, allowing $Q_1$ to conduct current through resistor $R_4$, L.E.D. indicator $D_5$ and through return wire 23 to contact element 21. When the a.c. cycle reverses, diode $D_4$ blocks current from flowing and prevents a back bias from being applied to transistor $Q_1$.

In the event that there is a d.c. voltage between contact elements 20, 21 of the correct polarity to cause diode $D_4$ to conduct, transistor $Q_1$ responds only briefly, due to the positive spike coupled through capacitor $C_1$, allowing indicator $D_5$ to flicker. Transistor $Q_1$ does not sustain current flow due to the d.c. blocking action of capacitor $C_1$.

Thus, when the test device 11 is substituted for the handset, as above described, the simultaneous illumination of both L.E.D. indicators $D_3$ and $D_5$ shows that the line wires at the input are properly connected and carry correct d.c. and a.c. voltages. Failure of only $D_3$ to light will indicate improper polarity of the tip/ring line wires or insufficient d.c. voltage on these wires. Failure of only $D_5$ to light will indicate lack of a.c. voltage on the "lamp" (yellow and black) line wires, whereas if $D_5$ only lights dimly it indicates insufficient a.c. voltage. Failure of both $D_3$ and $D_5$ to light indicates either that the d.c. and a.c. line voltages are absent or that the tip ring line conductors have been interchanged with the 10 volt a.c. line conductors.

While a specific embodiment of an improved telephone line test unit has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination with a four-terminal plug for connection of a telephone handset employing d.c. tip-ring voltage and a.c. lamp voltage coupled over d.c. and a.c. lines respectively, a telephone line testing device for assuring proper connections of said voltages to said lines comprising a support provided with a four-contact jack adapted to receive the four-terminal handset plug connected to said d.c. and a.c. lines, said jack having two d.c. contacts and two a.c. contacts, a series circuit branch on said support including a first rectifier and a first electrical light-emitting device, circuit means connecting said series circuit branch to the two d.c. contacts, a second circuit branch on said support comprising an a.c. amplifier including a d.c.-blocking input capacitor, a second electrical light-emitting device connected to the output of the amplifier, and a second rectifier connected in series with the input of the amplifier, and circuit means connecting said second circuit branch to the two a.c. jack contacts.

2. The telephone line testing device of claim 1, and a zener diode connected in said series circuit branch.

3. The telephone line testing device of claim 2, and wherein said zener diode has a conduction voltage of approximately 15 volts.

4. The telephone line testing device of claim 2, and wherein said zener diode is connected between said first rectifier and said first electrical light-emitting device.

5. A telephone line testing device comprising a support provided with a four-contact jack adapted to receive a four-terminal handset plug connected to the telephone lines, said jack having two d.c. contacts and two a.c. contacts, a series circuit branch on said support including a first rectifier and a first electrical light-emitting device, circuit means connecting said series circuit branch to the two d.c. contacts, a second circuit branch on said support comprising an a.c. amplifier including a d.c.-blocking input capacitor, a second electrical light-emitting device connected to the output of the amplifier, and a second rectifier connected in series with the input of the amplifier, and circuit means connecting said second circuit branch to the two a.c. jack contacts, and wherein said amplifier comprises a transistor, the output of said second rectifier being connected through said blocking capacitor to the base of the transistor and to the collector of the transistor, the second electrical light emitting device being connected in the emitter circuit of the transistor.

6. The telephone line testing device of claim 5, and wherein said series branch includes a zener diode connected between said first rectifier and said first electrical light-emitting device.

7. The telephone line testing device of claim 6, and wherein said zener diode has a conduction voltage of approximately 15 volts.

8. The telephone line testing device of claim 7, and wherein said electrical light-emitting devices comprise light-emitting diodes.

* * * * *